Patented Nov. 23, 1943

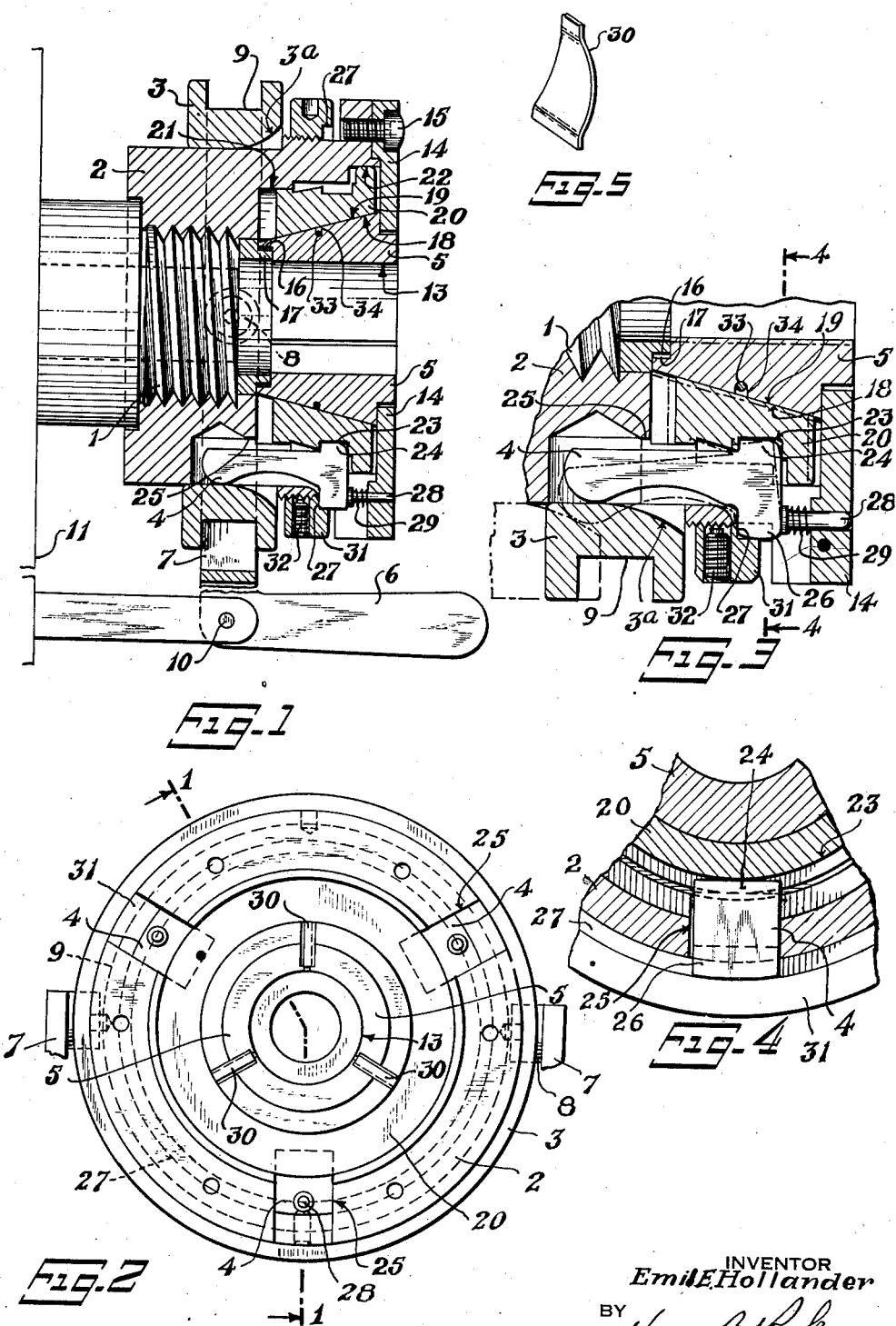

2,335,149

UNITED STATES PATENT OFFICE 2,335,149

LATHE CHUCK

Emil E. Hollander, Kearny, N. J., assignor to Star Electric Motor Company, Bloomfield, N. J., a corporation of New Jersey Application March 4, 1942, Serial No. 433,261

6 Claims. (Cl. 279—122)

This invention relates in general to collet chucks for use on lathes, and more particularly to a chuck having a split collet which is compressed to grip the work by a clamping sleeve that encircles and is coaxially slidable relatively to the collet and has an interior frusto-conical surface cooperating with exterior correspondingly tapered surfaces on the collet.

Certain chucks of this general character include a plurality of levers pivotally mounted on pivot pins and disposed within slots in the chuck body, said levers being operatively engaged with that collet clamping sleeve to slide the latter upon swinging of the levers in one direction, and the levers being swung in said direction by a cam on an operating ring that is slidable on the chuck body. These known chucks are relatively difficult to assemble and disassemble, particularly in mounting and removing the levers, and the points of pivoting of the levers are fixed and the levers are constrained to move in one and only one mode, so that compensation for relative maladjustment or wear of the levers and the parts of the chuck coacting therewith is impossible or difficult.

A prime object of my invention is to provide a chuck of the general character described which shall embody novel and improved features of construction, whereby the parts can be easily and quickly assembled and disassembled and wherein the levers can be adjusted in a simple manner to compensate for wear of the parts and to regulate the extent of closing movement of the collet by the levers.

Another object is to provide such a chuck wherein the levers can be mounted in and removed from the chuck body at the face or forward end thereof without removal of other parts except a face plate.

Further objects are to provide a chuck of this character wherein the levers shall be mounted without pivot pins but shall have fulcrum bearing points cooperating in a novel and improved manner with fulcrum bearing surfaces; and to provide novel and improved means for adjusting said fulcrum bearing surfaces to compensate for wear of the parts and to vary the extent of closing movement of the collet by the levers.

Other objects are to provide such a chuck that shall be simple and reliable in construction and operation, and to obtain other results and advantages as will be brought out by the following description in conjunction with the accompanying drawing in which Figure 1 is a vertical longitudinal sectional view through a chuck embodying my invention, taken on the line 1—1 of Figure 2.

Figure 2 is a front elevational view of the chuck with the face plate removed for clearness in illustration, Figure 3 is an enlarged fragmentary vertical longitudinal sectional view showing the manner of operating the chuck.

Figure 4 is a transverse vertical sectional view on the line 4—4 of Figure 3, and Figure 5 is a detached perspective view of one of the collet springs.

Specifically describing the invention, the chuck comprises a hollow body 2 that is interiorly screw threaded at one end for connection to a lathe spindle 1 and has a circular recess opening through the other end and provided with coaxial guide surfaces 21 and 22 in which a collet-clamping ring 20 is slidably mounted for movement coaxially with the chuck body.

The collet-clamping ring 20 cooperates with a segmental collet which is shown as comprising three sections 5 that form between them a circular opening 13 to receive the work; and the collet-clamping ring 20 has an interior frusto-conical, tapered surface 19 which cooperates with similarly tapered surfaces 18 on the collet sections so that said sections are moved inwardly toward each other to close the collet or are permitted to move radially outwardly to open the collet, upon longitudinal sliding of the clamping ring 20 in opposite directions respectively.

The chuck body 2 has a plurality of circumferentially spaced slots 25 that open through the periphery of the body and through the forward end thereof, and in each of said slots is arranged a T-shaped lever 4 for actuating the collet-clamping ring.

The collet clamping ring has an exterior circumferential groove 23 in which one arm 24 of the head of each lever 4 is disposed so as to articulate the levers with the clamping ring, and a bearing ring 31 encircles and is mounted on the chuck body and provided with a bearing surface 27 that is abuttingly engaged by the other arm 26 of the head of each of the levers 4 so that the points of contact of the arms 26 with the bearing surface 27 serve as fulcrums for the levers.

A face plate 14 is secured by cap screws 15 upon the forward end of the chuck body and overlies the forward end of the collet sections to prevent displacement of the collet from the chuck body. The face plate also has a plurality of slidable plungers 28 that normally are pressed into abutting contact with the forward ends of the respective levers 4 by springs 29, so that the levers are maintained in yielding contact with the bearing surface 27.

The shanks of the levers 4 extend rearwardly in the respective slots 25 so as to be engaged by an operating ring 3 that is coaxially slidable on the chuck body and has a cam surface 3a for positively rocking the levers in the direction to actuate the collet-clamping ring 20 so as to close the collet, upon movement of the operating ring in one direction, i. e., toward the face of the chuck. When the operating ring 3 is moved in the other direction, the cam surface 3a releases the levers 4 for rocking in the direction to release the collet-clamping ring for opening the collet. The levers may be rocked in the last-mentioned direction by centrifugal force incident to rotation of the chuck body, but preferably spring plates 30 are interposed between the adjacent collet section 5 so as to normally influence said sections apart to open the collet.

Any suitable means may be provided for moving the operating ring 3, for example, the ring may have a circumferential groove 9 in which are arranged diametrically opposite rollers 8 carried by a forked lever 7 that is pivotally mounted at 10 on any suitable fixed support, for example the head or bed of the lathe, and has an operating handle 6.

In operation of the chuck, normally the operating ring 3 will be in the position shown by dot and dash lines in Figure 3 so as to release the levers 4 and permit opening of the collet. After the work has been placed in the opening 13 of the collet, the operating ring 3 may be moved toward the face of the chuck so as to rock the levers 4 about the fulcrum bearing surface 27 so that the arms 24 of the levers will press against the walls of the groove 23 of the collet-clamping ring to actuate the latter toward the face of the chuck and thereby move the collet sections 5 inwardly to grip the work between them.

It is desirable to provide means for varying the relation of the fulcrum bearing surface 27 to the collet-clamping ring 20 so as to compensate for wear of the parts and to regulate the extent of movement of the collet sections by the levers. For this purpose, the ring 31 is adjustable longitudinally of the chuck body and as shown is screw threaded on the chuck body, a set screw 32 being provided to lock the ring in adjusted positions. The bearing surface 27 is in the form of an annular rabbet whose general plane is perpendicular to the axis of the chuck body and intersects the slots 25, with one wall of the rabbet facing outwardly toward the forward end of the chuck and the other wall facing inwardly toward the axis of the chuck. The rabbet forms a firm seat for the levers and the bearing surface can easily be adjusted by simple movement of the ring 31 longitudinally of the chuck body.

With this construction, it also will be observed that the levers 4 are firmly supported and held between the rabbet 27 and the groove 23 of the collet-clamping ring against bodily movement radially or laterally of the chuck body and the levers are held against movement forwardly out of the rabbet 27 by the spring plungers 28 mounted in the face plate 14.

It will be evident that upon simple removal of the face plate 14, the levers 4, collet and collet-clamping ring 20 can easily and quickly be removed from the chuck body. The levers 4 are applicable to and removable from the chuck body through the open ends of the slots 25 and the construction and arrangement of the levers and the bearing ring 31 obviate the necessity for pivot pins for the levers.

Also the levers are free for movement of limited extent in all directions so as to compensate for maladjustment or slight relative disarrangement of the relatively movable parts of the chuck.

It is desirable to prevent inward tilting of the collet sections, especially when pressure on the collet segments incident to clamping the work in the collet is concentrated adjacent the mouth of the collet, for example when the piece of work is short; and for this purpose the body of the chuck may have a flange 17 disposed in rabbets 16 in the collet sections so that there is just enough play between said flange and the collet sections to permit closing of the collet for gripping work.

It is desirable to handle the collet sections 5 as a unit, and accordingly the collet sections may have exterior circumferential grooves 34 in which is fitted a split ring 33 for holding the sections together.

While I have shown and described the now preferred embodiment of my invention, it will be understood by those skilled in the art that the details of structure of the chuck may be modified and changed without departing from the spirit or scope of the invention.

Having thus described my invention what I claim is:

1. A chuck comprising a hollow body having a rear end formed for connection to a lathe spindle and also having a plurality of circumferentially spaced slots opening through the periphery and the front end of the body, a segmental collet in said body and a collet-clamping ring encircling and slidable longitudinally of said collet, said collet and collet-clamping ring having cooperating tapered surfaces to close and to permit opening of the collet upon sliding of said clamping ring in opposite directions respectively, a lever in each of said slots and articulated with said collet-clamping ring, a bearing ring encircling and secured on said body and having on its front end a rabbet opening forwardly and comprising a surface whose general plane is perpendicular to the axis and faces the forward end of said body and another surface which faces said axis, said levers being abuttingly fulcrumed on said rabbet, means including a face plate secured to said body and closing the open ends of the slots to retain the levers in the slots and in contact with said rabbet, and means on said body for simultaneously rocking said levers to actuate said clamping ring to close the collet.

2. The chuck described in claim 1 wherein said collet-clamping ring has an exterior circumferential groove, said levers are T-shaped and each has one arm of its head abutting said rabbet and the other arm of its head disposed in said groove to articulate the lever with said collet-clamping ring, while the shank of each lever extends rearwardly in the corresponding slot, and the last-mentioned means cooperates with said shanks of the levers to rock the levers.

3. A chuck comprising a hollow body having one end formed for connection to a lathe spindle and also having a plurality of circumferentially spaced slots opening through the periphery and the other end of the body, a segmental collet in said body and a collet-clamping ring encircling and slidable longitudinally of said collet, said collet and collet-clamping ring having cooperating tapered surfaces to close and to permit opening of the collet upon sliding of said clamping ring in opposite directions respectively, a lever in each of said slots and articulated with said collet-clamping ring, a bearing ring encircling and adjustable longitudinally of said body and having an annular bearing rabbet comprising a surface whose general plane is perpendicular to the axis of said body and another surface which faces said axis, said levers being abuttingly fulcrumed on said rabbet, a face plate secured on said body and overlying the open ends of said slots, spring plungers in said face plate each abuttingly engaging one of said levers to hold it in contact with said rabbet, and means on said body for simultaneously rocking said levers to actuate said collet-clamping ring to close the collet.

4. A chuck comprising a hollow body having a rear end formed for connection to a lathe spindle and also having a plurality of circumferentially spaced slots opening through the periphery and the front end of the body, a segmental collet in said body and a collet-clamping ring encircling and slidable longitudinally of said collet, said collet and collet-clamping ring having cooperating tapered surfaces to close and to permit opening of the collet upon sliding of said clamping ring in opposite directions respectively, a lever in each of said slots and articulated with said collet-clamping ring, a bearing rabbet on said body upon which each lever is abuttingly fulcrumed, said rabbet opening toward the front end of the body and having one wall facing toward said front end of the body with its general plane perpendicular to the axis of the body and intersecting said slots, the other wall of said rabbet being coaxial with and facing toward the axis of the body, means including a face plate secured upon said front end of said body and closing said open ends of said slots to retain each lever in its slot and in contact with said bearing rabbet, and means on said body for simultaneously rocking said levers to actuate said collet-clamping ring to close the collet.

5. A chuck comprising a hollow body having a rear end formed for connection to a lathe spindle and also having a plurality of circumferentially spaced slots opening through the periphery and the front end of the body, a segmental collet in said body and a collet-clamping ring encircling and slidable longitudinally of said collet, said collet and collet-clamping ring having cooperating tapered surfaces to close and to permit opening of the collet upon sliding of said clamping ring in opposite directions respectively, a lever in each of said slots and articulated with said collet-clamping ring, a bearing rabbet on said body upon which each lever is abuttingly fulcrumed, said rabbet opening toward the front end of the body and having one wall facing toward said front end of the body with its general plane perpendicular to the axis of the body and intersecting said slots, the other wall of said rabbet being coaxial with and facing toward the axis of the body, a face plate secured on said body and overlying the open ends of said slots, spring plungers in said face plate each abuttingly engaging one of said levers to hold it in contact with said rabbet, and means on said body for simultaneously rocking said levers to actuate said collet-clamping ring to close the collet.

6. The chuck according to claim 4 wherein said face plate has an opening for insertion of work into said collet and has portions in abutting relation to said collet to prevent longitudinal displacement thereof from said body.

EMIL E. HOLLANDER.